April 19, 1938. W. KAHLLENBERGER 2,114,924
COMBUSTION POWER MACHINE WITH STREAM ATOMIZATION
Filed Dec. 12, 1929 2 Sheets-Sheet 1

INVENTOR.
Wilhelm Kahllenberger

Maréchal and Noe
ATTORNEYS

April 19, 1938.   W. KAHLLENBERGER   2,114,924
COMBUSTION POWER MACHINE WITH STREAM ATOMIZATION
Filed Dec. 12, 1929   2 Sheets-Sheet 2
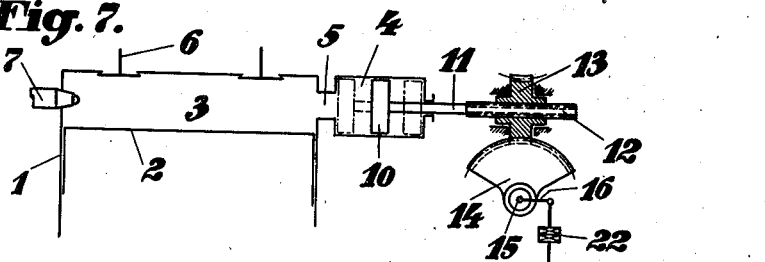
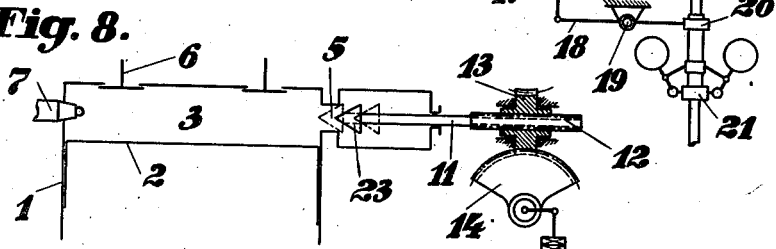
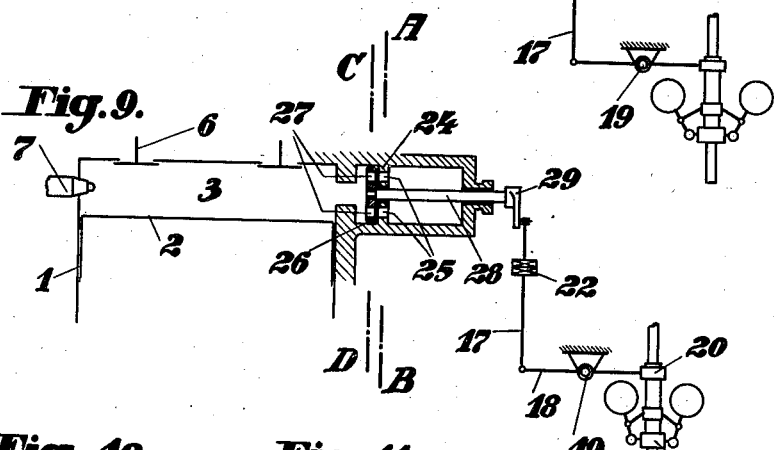
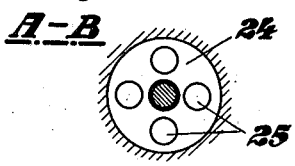
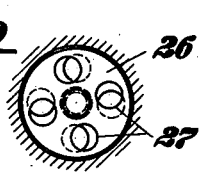
INVENTOR
Wilhelm Kahllenberger
Maréchal and Noé
ATTORNEYS Patented Apr. 19, 1938

2,114,924

UNITED STATES PATENT OFFICE 2,114,924

COMBUSTION POWER MACHINE WITH STREAM ATOMIZATION

Wilhelm Kahllenberger, Augsburg, Germany, assignor to Maschinenfabrik, Augsburg-Nürnberg A. G., Augsburg, Germany, a corporation of Germany Application December 12, 1929, Serial No. 413,592 In Germany December 17, 1928

8 Claims. (Cl. 123—32)

This invention relates to high speed internal combustion engines, and particularly to engines of the Diesel type operating with solid fuel injection.

One of the principal objects of the invention is to provide an internal combustion engine of this character which has a quiet operation and at the same time an efficient combustion.

Still another object of the invention is to provide an internal combustion engine of this character having an auxiliary or reservoir chamber or chambers communicating with the main combustion space, and situated so with regard to the injection nozzle, that a direct injection into the auxiliary chamber or chambers either cannot take place or occurs only to a small extent for securing a highly effective combustion and efficient operation.

Other objects and advantages of the invention will be apparent from the following description, the appended claims and accompanying drawings.

In the drawings, in which like characters of reference designate like parts throughout the several views thereof—

Fig. 7 is a central vertical diagrammatic view similar to Fig. 2, illustrating a control for the auxiliary chamber;

Fig. 8 is a central vertical diagrammatic view similar to Fig. 7 of a modified form of control;

Fig. 9 is a central vertical diagrammatic view similar to Fig. 7 of still another modified form of control;

Fig. 10 is a partial vertical sectional view on the plane of the line A—B of Fig. 9; and Fig. 11 is a partial vertical sectional view on the plane of the line C—D of Fig. 9.

High speed injection combustion engines operating with stream atomization, in which the injection and distribution of the fuel is obtained in a well known manner, as into the air space of the combustion chamber by suitable stream atomizing devices or nozzles, require a substantial advance of the moment of injection over the dead center position of the piston, due to the ignition delay or lag. This results in sharp ignitions with high ignition pressures, producing a loud and noisy operation of the engine. If the moment of injection be retarded, or moved closer to the dead center position of the piston relative to the cycle of engine operations, the operation of conventional types of engines of this character will become comparatively quiet, but combustion will be worse. The engine begins to smoke, the exhaust temperature rises and the fuel consumption increases.

According to the present invention, an engine of this character operating with solid fuel injection and self ignition is provided in which retardation of the moment of injection with a quiet operation of the engine is attained, and at the same time a highly effective combustion and efficient operation is produced. In accordance with this invention, the quantity of compressed air within the main combustion space of the cylinder toward the end of the compression stroke is reduced from that normally used for effective combustion of injected fuel, whereby a lower compression and ignition temperature and pressure is secured. Fuel is injected into the compressed air within the main combustion space with resultant ignition and combustion, producing a working or down stroke of the piston. And additional air is then introduced into the burning mass within the main combustion space during the combustion stroke to provide the additional air and to produce an agitation of the mass within the main combustion space to give an efficient combustion therein. This may be obtained by the provision of an auxiliary chamber, hereinafter referred to as a "reservoir chamber", which communicates with the main combustion space of the cylinder, and is so positioned relative to the fuel injection means or nozzles that a direct injection of fuel into the reservoir chamber does not occur, or at any rate not in more than a relatively small amount of the fuel injected.

Figure 1:
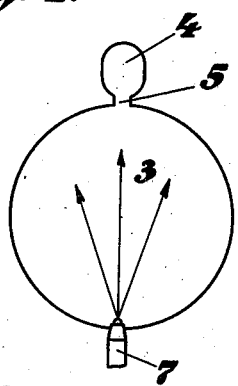
Fig. 1 is a horizontal sectional view, somewhat diagrammatic, of a cylinder of an engine constructed in accordance with this invention.
Figure 2:
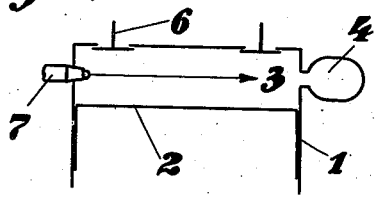
Fig. 2 is a central vertical diagrammatic view of the engine of Fig. 1.

Referring to Figs. 1 and 2, an engine of the Diesel type is illustrated having a cylinder 1 within which operates a piston 2. The cylinder is constructed with a main combustion space 3, and an auxiliary or closed reservoir chamber 4 which communicates laterally with the combustion space by means of a restricted passage 5. Combustion air may be introduced into the cylinder in the usual manner, as by an engine controlled valve 6 for four-cycle operation, or by piston controlled ports for two-cycle operation in the usual manner. An injection nozzle 7 carried laterally in the cylinder wall is provided with ports adapted to inject fuel in a plurality of atomized streams as indicated by the arrows, the orifices and stream directions of the ports being designed to fit the particular combustion chamber. In the arrangement shown, the reservoir chamber 4 is positioned in alignment with the central atomized stream from the injection nozzle and intermediate the outer fuel streams.

In operation, combustion air is drawn into the cylinder 1 on the suction stroke of the piston 2 through the valve 6 in the usual manner. On the compression stroke of the piston 2, a portion of the air contained within the cylinder 1 is forced into the reservoir chamber 4. Consequently at the instant of fuel injection, only a part of the entire air charge is contained within the main combustion space 3. Ignition which takes place upon the injection of fuel will therefore take place in the main combustion space, into which the fuel is directly injected, in the presence of a predetermined reduced air charge, whereby high ignition temperatures and pressures are avoided and a quiet operation of the engine is obtained. Upon the reversal of piston movement or upon the combustion stroke of the piston 2, the piston will then draw air from the reservoir chamber 4 into the main combustion space 3. Combustion within the cylinder therefore continues under constant air addition, and this feeding of air from the reservoir chamber through the restricted passage 5 effects at the same time a concurrent agitation of the charge within the main combustion space, whereby an effective and efficient combustion is obtained.

It is to be noted that the fuel injection nozzle is arranged at such a distance from the reservoir chamber 4 that a direct injection of fuel into the reservoir chamber does not occur, or at any rate only a relatively small amount of the injected fuel which, in engines having a rather small cylinder diameter, traverses across the main combustion space and finds its way into the reservoir chamber 4. Such a small amount of fuel which is transferred to the reservoir chamber 4 may become ignited therein, and the resulting pressure increase in this comparatively small reservoir chamber 4, together with the pressure drop in the main combustion space 3 caused by the reverse movement of the piston, produces a powerful return flow of unburned air from the reservoir chamber to the main combustion space. This active return flow of the air from the reservoir chamber effects a more complete intermixing of the later injected fuel, which has not been completely burned in the main combustion space, with this air rushing out from the reservoir chamber. A fresh and continued supply of air is thereby introduced into the burning products within the main combustion space during the combustion stroke. At the same time, the rush of air causes a turbulence of the contents in the main combustion space and thus provides the effective agitation which results in a good and complete combustion of the injected fuel.

Figure 3:
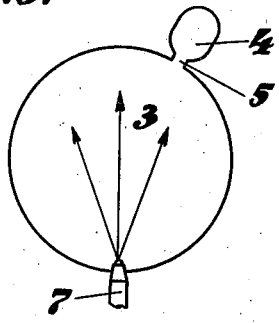
Fig. 3 is a horizontal diagrammatic view similar to Fig. 1 of a somewhat modified form of device.

This arrangement is, however, not essential for beneficial effects. The reservoir chamber may also be positioned at the side of, or between two adjacent atomized fuel streams, and good results obtained as described above. Thus in the arrangement shown in Fig. 3, the reservoir chamber 4 is not arranged diametrically opposite the injection nozzle 7 as in Fig. 1, but is angularly positioned so that the communicating passage 5 opens between two adjacent fuel streams from the injection nozzle 7.

Figure 4:
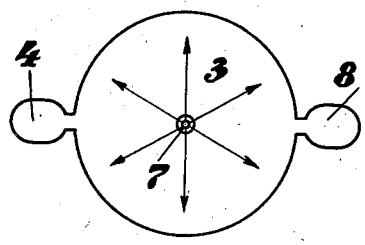
Fig. 4 is a horizontal diagrammatic view similar to Fig. 1 of still another modified form.
Figure 5:
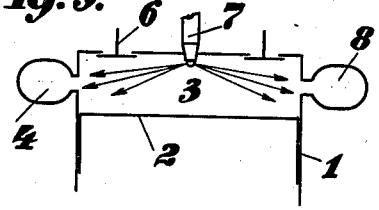
Fig. 5 is a central vertical diagrammatic view of Fig. 4.

In Figs. 4 and 5, the invention is illustrated in an engine provided with central fuel injection. In this form, the fuel injection nozzle 7 enters centrally through the cylinder head, and is provided with a plurality of injection ports to secure a number of radially directed atomized fuel streams as indicated by the arrows. The reservoir chamber 4 may be located either in alignment with a fuel stream or to the side of one, that is, between two adjacent fuel streams. As shown in these figures, a second reservoir chamber 8 is provided which is arranged diametrically opposite the reservoir chamber 4. By this means, the whirling effect of the air charge returning from the reservoir chambers upon the contents of the main combustion space is increased.

Figure 6:
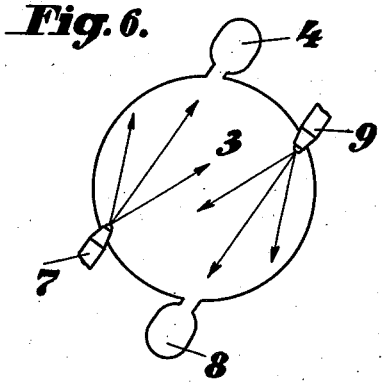
Fig. 6 is a horizontal diagrammatic view similar to Fig. 1 of still another modified form.

In Fig. 6, another form of the invention is illustrated in which two diametrically opposed nozzles 7 and 9 are introduced laterally through the cylinder wall, and are adapted to inject a plurality of atomized fuel streams in a manner to produce or augment whirling motion of the combustion air within the combustion space. Two diametrically opposed reservoir chambers 4 and 8 are also provided which communicate with the combustion space through restricted passages which are inclined against the direction of fuel injection. In this form, the longitudinal axes of the reservoir chambers 4 and 8 lie in alignment with the central fuel streams from the nozzles 7 and 9 respectively. It is to be understood, however, that the reservoir chambers may be located to the side of the fuel streams as described above. This arrangement also secures a highly effective agitation and efficient combustion.

The reservoir chamber provides an enlargement of the compression space of the cylinder. In order to permit this to be balanced against a corresponding decrease in compression, the size of the reservoir chamber may be made variable in accordance with engine operating conditions, such as in accordance with the load or speed of the engine. By this means it is possible to more readily effect the starting of the engine and to maintain the engine at proper ignition temperatures and pressures both at starting and during operation at light loads or reduced speeds.

This may be accomplished as illustrated in Fig. 7, which shows an arrangement similar to Fig. 1 having a laterally arranged injection nozzle 7 injecting fuel directly into the main combustion space 3, and a reservoir chamber 4 communicating laterally with the combustion space by a restricted passage 5. In this form, the reservoir chamber 4 is cylindrical and contains therein a piston 10 connected to a piston rod 11 passing through a suitable stuffing box at the end of the chamber. The piston rod 11 is rigidly connected with a screw shaft 12 having exterior screw threads which are threaded within internal threads of a gear 13 which is rotatably mounted in fixed axial position upon a suitable frame. The gear 13 meshes with a gear sector 14 carried by an oscillating shaft 15. The shaft 15 is rigidly connected with an arm or crank 16 which is in turn pivotally connected to a link 17. The link 17 is in turn pivotally connected to one end of a lever 18 fulcrumed at 19, the other end of the lever being pivotally connected to a sliding collar 20 of a suitable engine driven governor 21 which regulates the speed of the engine. Within the link 17, a detachable coupling 22 is provided, which is adapted to permit the manual disconnection and connection of the arm 16 with the speed regulator. This permits the piston 10 to be either manually controlled, or controlled in accordance with the engine operating conditions, such as in accordance with the speed or load.

In operation, when the engine is to be started from the cold, the coupling 22 is first moved to release position, thus rendering the regulator inoperative to affect the positioning of the piston 10. The piston is then moved manually to the dotted line position at the extreme left of the reservoir chamber 4, in which position the reservoir chamber is of the smallest size or is cut off from communication with the main combustion space. This permits a higher compression pressure to be produced within the combustion space 3 upon starting of the engine to thereby provide for easier starting. When the engine is brought into operation, the coupling 22 is then reconnected to bring the piston 10 under the influence of the regulator 21, whereby the piston 10 is positioned within the reservoir chamber in accordance with the load or speed of the machine in such a manner that it provides a larger sized reservoir chamber for higher speeds and a smaller sized reservoir chamber for lower speeds.

In Fig. 8, an arrangement similar to Fig. 7 is illustrated in which a throttling member or valve 23 is provided in place of the piston. As shown, this member is shaped as a valve cone, and is connected to the regulator in the manner previously described in connection with Fig. 7. When starting the engine cold, the coupling 22 is disconnected and this throttling member 23 is manually adjusted to completely close the passage 5 which connects the reservoir chamber 4 with the main combustion space 3. This gives the same effect as the piston in the form of Fig. 7, by providing the smallest volume of reservoir chamber at this time to give a higher compression pressure during starting. When the engine is brought into operation, the throttle 23 is connected by means of the coupling 22 with the regulator so that its position is adjusted relative to the entrance passage 5 in accordance with the load or speed of the engine. The construction is such that upon increasing load, the cross sectional area of the passage is increased, and upon decreasing load it is reduced in size. Thus the quantity of air forced or transferred into the reservoir chamber is correspondingly varied by throttling in accordance with engine conditions, with the result that the quantity of air remaining in the main combustion space and consequently the compression pressure produced therein is varied to give the most effective ignition temperatures and pressures for varying engine operating conditions. In both arrangements, the amount of air mass which is forced into the reservoir chamber is varied in accordance with engine operation, this being accomplished in Fig. 7 by varying the size of the reservoir chamber and in Fig. 8 by varying the throttling of the passage connecting the reservoir chamber with the main combustion space.

In Figs. 9 to 11, another form of the invention similar to that of Fig. 8 is illustrated. In this case, a disk 24 is rigidly secured within the reservoir chamber 4, this disk being provided with spaced openings or ports 25. Adjacent this disk on the combustion chamber side thereof is another disk 26 having corresponding ports 27. The disk 26 is rotatably supported and secured to a shaft 28 extending through an opening in the disk 24 and through a suitable stuffing box in the end of the reservoir chamber 4 to the exterior thereof. The shaft 28 carries on the exterior of the reservoir chamber 4 a crank arm 29 which is pivotally connected to a link 17, within which is arranged a coupling 22 in the manner previously described.

In the operation of this form, when starting the engine the regulator 22 is disconnected and the movable disk 26 is manually adjusted by the shaft 28 so that the openings 27 of this disk are brought out of alignment with the openings 25 of the disk 24 to thereby close off communication of the reservoir chamber 4 with the combustion space 3. When the engine is brought into operation, the regulator is connected by the coupling 22 to the shaft 28, and thus the rotatable disk 26 is positioned by the regulator in accordance with engine conditions. The construction is such that the openings 27 of the rotatable disk 26 will approach the openings 25 of the stationary disk 24 and thus provide greater communication between the chamber 4 and the combustion space 3 upon increase in load or speed conditions of the engine, and the communication through the openings 25 and 27 will be correspondingly throttled or reduced upon decrease in speed or load conditions. Thus according to the relative positions of the movable and stationary disks, a greater or lesser throttling of the communicating passage between the reservoir chamber 4 and the main combustion space 3 is obtained.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A high speed Diesel engine comprising a cylinder having a main combustion space, a piston operating therein, a reservoir chamber communicating with said combustion space, means for introducing combustion air into said cylinder whereby on the compression stroke of said piston a portion of the combustion air is compressed within said reservoir chamber, means for injecting fuel into said compressed air within the main combustion space with resultant self-ignition and combustion, and means operable automatically in accordance with engine speed for regulating the quantity of air compressed within said reservoir chamber to increase the quantity of said air with increase in engine speed and vice versa.

2. In combination in an injection engine, a cylinder and a piston operating therein, a combustion chamber having a peripheral wall curved in a plane substantially normal to the cylinder axis, said chamber opening freely into the cylinder for free flow of the fuel mixture into said cylinder during the working stroke of the piston, an injection nozzle for injecting the entire charge of fuel directly into said combustion chamber, and an air storage chamber opening into the combustion chamber at the peripheral wall thereof through a restricted passage, said chamber being otherwise closed to the entry of fuel, the passage being arranged to impart rotary turbulence to the fuel mixture within the combustion chamber in a plane substantially normal to the cylinder axis.

3. In combination in an injection engine, a cylinder and a piston operating therein, a combustion chamber having a peripheral wall curved in a plane substantially normal to the cylinder axis, said chamber opening freely into the cylinder for free flow of the fuel mixture into said cylinder during the working stroke of the piston, an injection nozzle for injecting the entire quantity of fuel directly into said combustion chamber, and a plurality of air storage chambers opening into the combustion chamber at the peripheral wall thereof through separate restricted passages, said chambers being otherwise closed to the entry of fuel, said passages being arranged to impart rotary turbulence to the fuel mixture within the combustion chamber in a plane substantially normal to the cylinder axis.

4. In combination in an injection engine, a cylinder and a piston operating therein, a combustion chamber having a peripheral wall curved in a plane substantially normal to the cylinder axis, said chamber opening freely into the cylinder for free flow of the fuel mixture from said combustion chamber into said cylinder, an injection nozzle for injecting the entire charge of fuel directly into the combustion chamber, and an air storage chamber opening into the combustion chamber at the peripheral wall thereof by a passage arranged to impart rotary turbulence to the fuel mixture charge within the combustion chamber, said air storage chamber being otherwise closed to the entry of fuel, in a plane substantially normal to the cylinder axis and ejecting air into said charge, the rotating mixture flowing freely from the combustion chamber into the cylinder in the working stroke of the piston and the rotary turbulence of the fuel mixture charge continuing within the cylinder.

5. In combination in an injection engine, a cylinder and a piston operating therein, a combustion chamber above said piston having a peripheral wall curved about the cylinder axis, said chamber opening freely into said cylinder, a reservoir chamber communicating with said combustion chamber through a restricted passage opening through the wall of said combustion chamber and said reservoir chamber being otherwise closed to entry of fuel, means for introducing combustion air into said combustion chamber, means for injecting the entire charge of fuel into the air within the combustion chamber to initiate combustion therein and to produce a working stroke of the piston, during which there is back flow from the reservoir chamber into said combustion chamber, said passage being arranged to cause said back flow to impart rotary turbulence to the fuel mixture within the combustion chamber about the cylinder axis and said turbulence of the fuel mixture charge continuing within the cylinder as the piston moves on its working stroke whereby to effect smooth burning of the fuel.

6. In combination in an air injection engine, a cylinder and a piston operating therein, a combustion chamber above said piston having a peripheral wall curved about the cylinder axis, said chamber opening freely into said cylinder, a reservoir chamber communicating with said combustion chamber through a restricted passage arranged to open through the peripheral wall of the combustion chamber and said reservoir chamber being otherwise closed to entry of fuel, the axis of said passage lying within a plane substantially normal to the cylinder axis, means for introducing combustion air into said combustion chamber whereby on the compression stroke of said piston a portion of the combustion air is compressed within said reservoir chamber, means for injecting the entire charge of fuel into the air within the combustion chamber to initiate combustion therein, said passage being arranged to cause back flow therefrom to impart rotary turbulence to the fuel mixture within the combustion chamber about the cylinder axis.

7. In combination in an injection engine, a cylinder and a piston operating therein, a combustion chamber above said piston having a peripheral wall curved about the cylinder axis, said chamber opening freely into said cylinder, a reservoir chamber communicating with said combustion chamber through a restricted passage opening through the wall of said combustion chamber and said reservoir chamber being otherwise closed to entry of fuel, means for introducing combustion air into said combustion chamber, means for injecting the entire charge of fuel into the air within the combustion chamber to initiate combustion therein, said passage being arranged to discharge air from said reservoir chamber transversely across said piston and combustion space and to impart rotary turbulence to the fuel mixture within the combustion space along said peripheral wall curved about the cylinder axis.

8. In combination in an injection engine, a cylinder and a piston operating therein, a combustion chamber above said piston having a peripheral wall curved about the cylinder axis, said chamber opening freely into said cylinder, a plurality of reservoir chambers communicating with said combustion chamber through restricted passages opening through the wall of said combustion chamber and said reservoir chamber being otherwise closed to entry of fuel, means for introducing combustion air into said combustion chamber, means for injecting the entire charge of fuel into the air within the combustion chamber to initiate combustion therein and to produce a working stroke of the piston, during which air from said reservoir chambers flows back into said combustion chamber, said passages being arranged to cause said plurality of air streams each to impart rotary turbulence to the fuel mixture within the combustion chamber about the cylinder axis as the piston moves on its working stroke whereby to effect smooth burning of the fuel.

WILHELM KAHLLENBERGER.